United States Patent Office 3,849,343
Patented Nov. 19, 1974

3,849,343
METHOD OF CATALYST MANUFACTURE
James Hoekstra, Evergreen Park, Ill., assignor to Universal Oil Products Company, Des Moines, Ill.
No Drawing. Filed Feb. 5, 1973, Ser. No. 329,956
Int. Cl. B01j 11/08
U.S. Cl. 252—466 PT       11 Claims

ABSTRACT OF THE DISCLOSURE

In an improved method of catalyst manufacture, a carrier material is impregnated with an aqueous solution of at least one platinum group metal compound and then with a compound of an alkaline earth metal in aqueous solution with a reducing agent. Inclusion of the reducing agent, e.g. hydrazine, obviates leaching of the platinum group metal component from the carrier material during the second impregnation step. Otherwise, an intermediate high temperature calcination step is required.

---

A catalytic composite particularly adapted to the catalytic oxidation of noxious exhaust gases is disclosed in U.S. Pats. 3,388,077 and 3,409,390 together with a method of manufacture. Briefly, the catalytic composite consists of a porous refractory carrier material, a platinum group metal component and an alkaline earth metal component which may be calcium, strontium and/or barium. The disclosed method of preparation is by impregnation of the carrier material with a solution of a compound of a platinum group metal, preferably an aqueous chloroplatinic acid solution, and a solution of a compound of an alkaline earth metal, preferably an aqueous barium oxide or barium hydroxide solution, and it is disclosed that the alkaline earth metal component may be composited with the carrier material either before or after the impregnation thereof with the platinum group metal component.

Subsequent associated work has revealed the order of impregnation to have a significant influence on catalyst activity. Thus, when the alkaline earth metal component is impregnated on the carrier material either prior to or simultaneously with the platinum group metal component, an inferior catalytic composite is obtained, most likely as a result of poor distribution of the platinum group metal component on the carrier material. On the other hand, when the platinum group metal component is impregnated on the carrier material prior to the alkaline earth metal component, an intermediate high temperature calcination is required to prevent leaching of the expensive platinum group metal component from the carrier material in the course of the subsequent alkaline earth metal impregnation operation. It will be appreciated that the required intermediate high temperature calcination is a substantial factor in determining the cost of this highly useful exhaust gas conversion catalyst.

It is therefore an object of this invention to present a method of impregnating a porous refractory carrier material with a platinum group metal component and an alkaline earth metal component at conditions to obviate the need of an intermediate high temperature calcination step. Thus, in one of its broad aspects, the present invention embodies a method of preparing a catalytic composite of a porous refractory carier material, a platinum group metal component and an alkaline earth metal component which comprises impregnating said carrier material with a solution of a compound of at least one platinum group metal and, prior to calcining the impregnated carrier material, further impregnating the same with a compound of said alkaline earth metal in solution with a reducing agent.

Other objects and embodiments of this invention will become apparent in the following detailed specification.

The catalytic composite of this invention comprises a porous refractory carrier material. The carrier material may be a naturally occurring material, for example clays and silicates such as fuller's earth. Attapulgus clay, feldspar, halloysite, montmorillonite, kaolin, and diatomaceous earth, frequently referred to as siliceous earth, diatomaceous silicate, kieselguhr, and the like, and the naturally occurring material may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia and the like, and having a total surface area of from about 25 to about 700 square meters per gram, are especially suitable. In some cases, the refractory inorganic support or carrier material may also exhibit a catalytic effect alone or in combination with the other components of a catalytic composite. Alumina is a preferred refractory inorganic oxide, and the alumina may be any of the various hydrous aluminum oxides or alumina gels such as boehmite, gibbsite, bayerite, and the like. Activated aluminas, such as have been thermally treated at a temperature in excess of about 400° C. with the elimination of at least a portion of the chemically and/or physically combined water and hydroxyl groups commonly associated therewith, are particularly suitable. One suitable carrier material comprises the porous refractory inorganic oxide, for example alumina, deposited as a thin film on a relatively low surface area ceramic material, for example sillimanite, petalite, cordierite, mullite, zircon, spodumene, etc. The ceramic material is advantageously employed as a rigid, unitary honeycomb type structure, frequently referred to as a monolithic structure, providing a plurality of adjacent, parallel, undirectional channels for passage of a reactant stream therethrough. However, the carrier material may be employed in any suitable shape or form including spheres, pills, pellets, granules, rings, etc. The catalytic composite of this invention is preferably utilized in the form of low density spheroidal particles, preferably spheroidal particles having an average bulk density of from about 0.3 to about 0.5 grams per cubic centimeter. Low density alumina spheres are conveniently and advantageously prepared by the well-known oil-drop method. Briefly, an alumina sol, such as results from digesting aluminum in hydrochloric acid under controlled conditions, is dispersed as droplets in a hot oil bath whereby gelation occurs with the formation of spheroidal gel particles. In this type of operation, the alumina is set chemically utilizing ammonia as a neutralizing or setting agent. Usually, the ammonia is furnished by an ammonia precursor, such as hexamethylenetetramine which is included in the sol. Only a fraction of the ammonia precursor is hydrolyzed or decomposed to ammonia in the relatively short period during which the initial gelation occurs. During the subsequent aging process, the residual ammonia precursor retained in the gel particles continues to hydrolyze and effect further polymerization of the alumina whereby desirable pore characteristics are established. After a suitable aging period, usually from about 10 to about 24 hours at a temperature in the 120–220° F. range, the alumina spheres are washed, dried and calcined or activated at a temperature of from about 930 to about 1560° F. The oil-drop method is described in detail in U.S. Pat. No. 2,620,314 and in the U.S. Pat. No. 3,600,-129.

Pursuant to the present method of catalyst preparation, the selected carrier material is initially impregnated with a solution of a compound of a platinum group metal.

Thus, the carrier material can be suspended, soaked, dipped one or more times, or otherwise immersed in an aqueous solution of a compound or compounds of one or more platinum group metals, i.e. platinum, palladium, ruthenium, rhodium, osmium, and iridium, in accordance with prior art practice, the platinum group metal concentration of said solution being sufficient to deposit from about .0025 to about 2.0 wt. percent platinum group metal or metals on the carrier material, based on the weight of the final catalyst composite. Suitable platinum group metal compounds are such as chloroplatinic acid, platinum tetrachloride, chloropalladic acid, palladium chloride, ruthenium trichloride, rhodium trichloride, osmium trichloride, chloriridic acid, iridium trichloride, etc. It is a preferred practice to include certain organic acids, notably citric acid, in the impregnating solution to promote an even distribution of the platinum group metal component in a sub-surface layer a finite distance from the center and exterior surface of the carrier material, although impregnation of the carrier material with the requisite amount of organic acid, say from about 0.1 to about 1.5 wt. percent based on the weight of the carrier material, may be effected prior to impregnation with the platinum group metal or metals to accomplish substantially the same purpose. Other suitable organic acids include oxalic, malonic, succinic, glutaric, adipic, pimelic, suberic, malic, tartaric, and the like. In any case, the carrier material is preferably maintained in contact with the impregnating solution for at least about 30 minutes at ambient temperature, and the solution thereafter evaporated to dryness in contact with the carrier material. For example, a volume of carrier material is immersed in a substantially equal volume of an aqueous chloroplatinic acid solution in a steam-jacketed rotary dryer and tumbled therein for a brief period at room temperature. Steam is thereafter applied to the dryer jacket to expedite evaporation of the solution and recovery of substantially dry impregnated particles. While platinum per se has long been preferred as a catalyst component to catalyze the oxidation of noxious exhaust gases, it has more recently been found that the required amount of the relatively expensive platinum can be substantially reduced utilizing a palladium promoter, and it has been further found that substantially less total platinum group metals, platinum and palladium, is required to obtain substantially complete conversion than is the case with platinum alone. In this instance, the impregnating solution is preferably a common aqueous solution of chloroplatinic acid and chloropalladic acid and/or palladium chloride containing palladium and platinum in a weight ratio of from about 9:1 to about 1:4.

In accordance with the method of this invention, prior to calcining the platinum group metal-impregnated carrier material, the composite is further impregnated with a compound of an alkaline earth metal in solution with a reducing agent. Suitable reagents are soluble materials which react under impregnating conditions to reduce and fix the platinum group metal component on the carrier material at a rate to obviate the leaching effect of the impregnating solution. Suitable reducing agents thus include hydroxylamine, hydroxylamine sulfate, and the like, and the water-soluble aldehydes such as formaldehyde, or the reducing sugars containing an aldehyde functional group, for example glucose, maltose, etc. Hydrazine, hydrazine hydrate, hydrazine sulfate, dihydrazine sulfate, hydrazine monochloride, and the like, are strong reducing agents particularly useful in the method of manufacture of this invention. The preferred reducing agents are those which leave no residue on the carrier material. In this and other respects, hydrazine and hydrazine hydrate are preferred reducing agents.

While the refractory carrier materials herein contemplated are generally useful as a catalyst support or carrier material and exceptionally resistant to physical degradation in a more conventional type of operation, they experience shrinkage at the extreme temperature conditions encountered in the treatment of exhaust gases from an internal combustion engine, and the ultimate effect is breakage and undue loss of catalyst. This is particularly true with respect to the more desirable low density carrier materials. The alkaline earth metal component of the catalytic composite of this invention, that is, calcium, strontium and/or barium, imparts improved activity, activity stability, and especially improved physical stability to the catalytic composite. Of the alkaline earth metals, barium is preferred. The optimum alkaline earth metal content is a function of the density of the selected carrier material. It will be appreciated that carrier materials of higher density suffer less shrinkage at higher temperatures than do those of lower density, and the optimum alkaline earth metal content will therefore increase in the range of from about 1 to about 20 wt. percent with decreasing density. Preferably the refractory carrier material is alumina characterized by an average bulk density of from about 0.3 to about 0.5 grams per cubic centimeter, and the alkaline earth content, preferably barium, is in the range of from about 8 to about 10 wt. percent.

Impregnation with the selected alkaline earth metal compound in solution with the aforementioned reducing agent is suitably effected in a relatively brief period utilizing simple impregnation techniques. For example, the platinum group metal-impregnated carrier material is advantageously immersed in a heated, stirred aqueous solution of the aforesaid reducing agent and an alkaline earth metal component, such as barium oxide, to effect suitable impregnation over a period of less than about 5 minutes. Other alkaline earth metal compounds which can be utilized include barium hydroxide, barium nitrate, barium chloride, barium sulfide, barium formate, barium acetate, barium chloroplatinate, calcium hydroxide, calcium nitrate, calcium chloride, calcium sulfide, calcium formate, calcium acetate, strontium hydroxide, strontium nitrate, strontium chloride, strontium sulfide, strontium formate, strontium acetate, and the like. The excess impregnating solution is decanted or otherwise separated from the impregnated carrier material which is subsequently calcined, preferably in air, at a temperature of from about 700° to about 1800° F. for a period of from about 2 to about 4 hours to yield the desired catalytic composite.

In accordance with the foregoing, one preferred embodiment of the method of this invention comprises impregnating an alumina carrier material with an aqueous solution of chloroplatinic acid and palladium chloride and, prior to calcining the impregnated alumina, further impregnating the same with barium oxide in aqueous solution with hydrazine hydrate, and thereafter drying and calcining the resultant composite at a temperature of from about 700° to about 1800° F. in an oxidizing atmosphere. The following example is presented in illustration of one preferred embodiment of this invention and is not intended as an undue limitation on the generally broad scope of the invention as set out in the appended claims.

EXAMPLE I 200 grams of 1/8 inch gamma-alumina spheres having an average bulk density of 0.30 grams per cubic centimeter were immersed in 600 milliliters of an aqueous solution of chloroplatinic acid and palladium chloride contained in a steam-jacketed rotary dryer. The impregnating solution contained the equivalent of 2.018 grams of platinum and .075 grams of palladium, and further contained .150 grams of citric acid monohydrate. The spheres were tumbled in the solution, and the solution evaporated to dryness in contact therewith. The impregnated spheres were then immersed in a hot (150° F.) stirred 600 milliliter aqueous solution of 40 grams of barium oxide and 0.42 grams of hydrazine hydrate. After about 1 minute, the solution was decanted and the spheres dried for 2 hours at 250° F. in a forced draft oven. The dried spheres were subsequently calcined in a flow of air for 2 hours at 1000° F. to yield a catalytic composite containing .009 wt. percent platinum, .036 wt. percent palladium, and about 9 wt. percent barium. This example demonstrates that the inclusion of a reducing agent, e.g., hydrazine hydrate, obviates leaching of the platinum group metal component from the carrier material during the second impregnation step.

I claim as my invention:

1. In the preparation of a catalytic composite wherein a porous refractory carrier material is impregnated with a solution of a compound of a platinum group metal and a solution of a compound of an alkaline earth metal selected from the group consisting of calcium, strontium and barium, the improvement which comprises:
   (a) impregnating a porous refractory carrier material with a solution of a compound of at least one platinum group metal;
   (b) prior to calcining the impregnated carrier material, further impregnating the same with a compound of said alkaline earth metal in solution with a reducing agent; and
   (c) thereafter drying and calcining the resultant composite.

2. The improvement of Claim 1 further characterized with respect to step (b) in that said reducing agent is a hydrazine reducing agent.

3. The improvement of Claim 1 further characterized with respect to step (b) in that said reducing agent is hydrazine hydrate.

4. The improvement of Claim 1 further character with respect to step (a) in that said carrier material is a refractory inorganic oxide.

5. The improvement of Claim 1 further characterized with respect to step (a) in that said carrier material is alumina.

6. The improvement of Claim 1 further characterized with respect to step (b) in that said alkaline earth metal is barium.

7. The improvement of Claim 1 further characterized with respect to step (b) in that said compound of an alkaline earth metal is barium oxide.

8. The improvement of Claim 1 further characterized with respect to step (a) in that said carrier material is impregnated with a solution of a platinum compound.

9. The improvement of Claim 1 further characterized with respect to step (a) in that said carrier material is impregnated with a solution of a platinum compound and a palladium compound.

10. The improvement of Claim 1 further characterized with respect to step (a) in that said carrier material is impregnated with a solution of chloroplatinic acid and palladium chloride.

11. The improvement of Claim 1 further characterized with respect to step (c) in that said calcining is effected in an oxidizing atmosphere at a temperature of from about 700° F. to about 1800° F.

References Cited
UNITED STATES PATENTS

| | | | |
|---|---|---|---|
| 3,388,077 | 6/1968 | Hoekstra | 252—466 B |
| 3,409,390 | 11/1968 | Hoekstra | 252—466 B X |
| 3,655,747 | 4/1972 | Sennewald et al. | 252—473 X |
| 3,682,838 | 8/1972 | Bloch | 252—473 X |
| 3,347,900 | 10/1967 | Gössel et al. | 252—473 X |
| 3,373,219 | 3/1968 | Krönig et al. | 252—466 PT X |
| 3,437,426 | 4/1969 | Quesada | 252—466 B X |
| 3,644,486 | 2/1972 | Boldt et al. | 252—473 X |

HELEN M. S. SNEED, Primary Examiner

U.S. Cl. X.R.

252—473